(12) United States Patent
Sasaki

(10) Patent No.: US 11,314,968 B2
(45) Date of Patent: Apr. 26, 2022

(54) INFORMATION PROCESSING APPARATUS, CONTROL METHOD, AND PROGRAM

(71) Applicant: NEC CORPORATION, Tokyo (JP)

(72) Inventor: Kazuyuki Sasaki, Tokyo (JP)

(73) Assignee: NEC CORPORATION, Tokyo (JP)

(*) Notice: Subject to any disclaimer, the term of this patent is extended or adjusted under 35 U.S.C. 154(b) by 36 days.

(21) Appl. No.: 16/646,215

(22) PCT Filed: Sep. 12, 2017

(86) PCT No.: PCT/JP2017/032921
§ 371 (c)(1),
(2) Date: Mar. 11, 2020

(87) PCT Pub. No.: WO2019/053789
PCT Pub. Date: Mar. 21, 2019

(65) Prior Publication Data
US 2020/0279103 A1 Sep. 3, 2020

(51) Int. Cl.
*G06K 9/00* (2006.01)
(52) U.S. Cl.
CPC ..... *G06K 9/00348* (2013.01); *G06K 9/00369* (2013.01); *G06K 9/00771* (2013.01)
(58) Field of Classification Search
CPC ........... G06K 9/00348; G06K 9/00369; G06K 9/00771; H04N 7/18; G06T 1/00
USPC ...................................................... 382/103
See application file for complete search history.

(56) References Cited

U.S. PATENT DOCUMENTS

2019/0026560 A1* 1/2019 Nishikawa ......... G06K 9/00677
2020/0111031 A1* 4/2020 Wakim ............... G06K 9/00295

FOREIGN PATENT DOCUMENTS

| JP | 2005-316582 A | 11/2005 |
|----|---------------|---------|
| JP | 2008-519567 A | 6/2008 |
| JP | 2009-110054 A | 5/2009 |
| JP | 2010-124028 A | 6/2010 |
| JP | 2013-109395 A | 6/2013 |
| JP | 2015-194915 A | 11/2015 |
| WO | 2016/114392 A1 | 7/2016 |

OTHER PUBLICATIONS

International Search Report received in International Application No. PCT/JP2017/032921 dated Dec. 5, 2017.
Japanese Office Action for JP Application No. 2019-541524 dated Jun. 1, 2021 with English Translation.

* cited by examiner

*Primary Examiner* — Stephen P Coleman
(74) *Attorney, Agent, or Firm* — Sughrue Mion, PLLC

(57) ABSTRACT

An information processing apparatus (2000) detects leaving of an object to be determined from an object queue (20) included in video data (12) generated by a camera (10). The information processing apparatus (2000) infers a global behavior of the object to be determined on the basis of a relationship between the object to be determined and another object (22) included in the object queue (20). The information processing apparatus (2000) determines whether or not the object to be determined has left the object queue (20) on the basis of the global behavior of the object to be determined.

20 Claims, 16 Drawing Sheets

FIG. 5

| TRACKING ID | POSITION | DISTANCE | LOCAL INFORMATION | GLOBAL INFORMATION | IMAGE FEATURE |
|---|---|---|---|---|---|
| id0001 | (x11, y11) | d1 | STANDSTILL | STANDSTILL | f11, f12 |
| id0002 | (x21, y21) | d2 | PROCEEDING | LEAVING | f21, f22 |
| id0003 | (x31, y31) | d3 | PROCEEDING | PROCEEDING IN QUEUE | f31, f32 |
| id0004 | (x41, y41) | d4 | RECEDING | RECEDING IN QUEUE | f41, f42 |
| ... | ... | ... | ... | ... | ... |

FIG. 9

| A \ B | PROCEEDING | STANDSTILL | RECEDING |
|---|---|---|---|
| PROCEEDING | PROCEEDING IN QUEUE | LEAVING ACTION | LEAVING ACTION |
| STANDSTILL | BEING ABLE TO PROCEED IN QUEUE | STANDSTILL | BEING ABLE TO RECEDE IN QUEUE |
| RECEDING | LEAVING ACTION | LEAVING ACTION | RECEDING IN QUEUE |

FIG. 16

| B \ C | PROCEEDING | STANDSTILL | RECEDING |
|---|---|---|---|
| PROCEEDING | STAYING or PASSING | CUTTING-IN ACTION | CUTTING-IN ACTION |
| STANDSTILL | STAYING or PASSING | STAYING or PASSING | CUTTING-IN ACTION |
| RECEDING | STAYING or PASSING | STAYING or PASSING | STAYING or PASSING |

INFORMATION PROCESSING APPARATUS, CONTROL METHOD, AND PROGRAM

TECHNICAL FIELD

The present invention relates to image processing.

BACKGROUND ART

In various scenes, a queue is formed by objects such as persons. For example, the queue is formed at an immigration checkpoint of an airport, a bank ATM, a checkout of a store, or a platform of public transportation.

A technology for performing analysis and control on such a queue has been developed. For example, Patent Document 1 discloses a queue management system that can track an object having left the queue or an object cutting in the queue using a camera which is installed to be capable of capturing a monitoring region from immediately above. This system determines whether each object is in the queue or outside the queue using a queue behavior pattern parameter, such as a distance between the queue and the object, that represents a motion of the object. The leaving or cutting-in of the object is also determined using the queue behavior pattern parameter.

RELATED DOCUMENT

Patent Document

[Patent Document 1] Japanese Unexamined Patent Application Publication (Translation of PCT Application) No. 2008-519567

SUMMARY OF THE INVENTION

Technical Problem

In Patent Document 1, only a case where the object leaves in a direction orthogonal to a direction in which the queue is formed is considered with respect to the leaving of the object. However, the direction in which the object leaves is not limited to the direction orthogonal to the direction in which the queue is formed. For example, in a queue that is formed on a narrow aisle like a waiting queue formed at a checkout of a convenience store, the object leaves in a direction parallel to the direction in which the queue is formed. Leaving in such a case is not considered in the system of Patent Document 1.

In addition, in Patent Document 1, it is determined that cutting-in occurs in a case where the object is at a certain distance from the queue. In an actual scene of usage, there is also an object that simply passes near the queue, or an object that stays near the queue. In Patent Document 1, these objects are handled as "having a possibility of lining up in the queue", and no further description is provided.

The present invention is conceived in view of the above problem. One object of the present invention is to provide a technology for detecting leaving of an object from an object queue or cutting-in with high accuracy.

Solution to Problem

An information processing apparatus of the present invention includes 1) a behavior inference unit that detects a first object and a second object included in an object queue using a captured image in which the object queue is included, and infers a global behavior of the first object based on a relationship between the first object and the second object, and 2) a determination unit that determines whether or not the first object has left the object queue on the basis of the inferred global behavior of the first object.

A control method of the present invention is executed by a computer. The control method includes 1) a behavior inference step of detecting a first object and a second object included in an object queue using a captured image in which the object queue is included, and inferring a global behavior of the first object based on a relationship between the first object and the second object, and 2) a determination step of determining whether or not the first object has left the object queue on the basis of the inferred global behavior of the first object.

A program of the present invention causes a computer to execute each step of the control method of the present invention.

Advantageous Effects of Invention

According to the present invention, a technology for detecting leaving of an object from an object queue or cutting-in with high accuracy is provided.

BRIEF DESCRIPTION OF THE DRAWINGS

The above object and other objects, features, and advantages will become more apparent from example embodiments set forth below and the following drawings appended thereto.

FIG. 5 is a diagram illustrating tracking information in a table format.

FIG. 9 is a first diagram illustrating a table showing a global behavior of an object to be tracked.

FIG. 16 is a diagram illustrating a table showing a global behavior of a second object to be determined.

DESCRIPTION OF EMBODIMENTS

Hereinafter, example embodiments of the present invention will be described using the drawings. It should be note that in all of the drawings, the same constituents will be designated by the same reference signs, and descriptions of such constituents will not be repeated. In addition, in each block diagram, unless otherwise particularly described, each block does not represent a hardware unit configuration and represents a function unit configuration.

Example Embodiment 1

Summary

Figure 1:
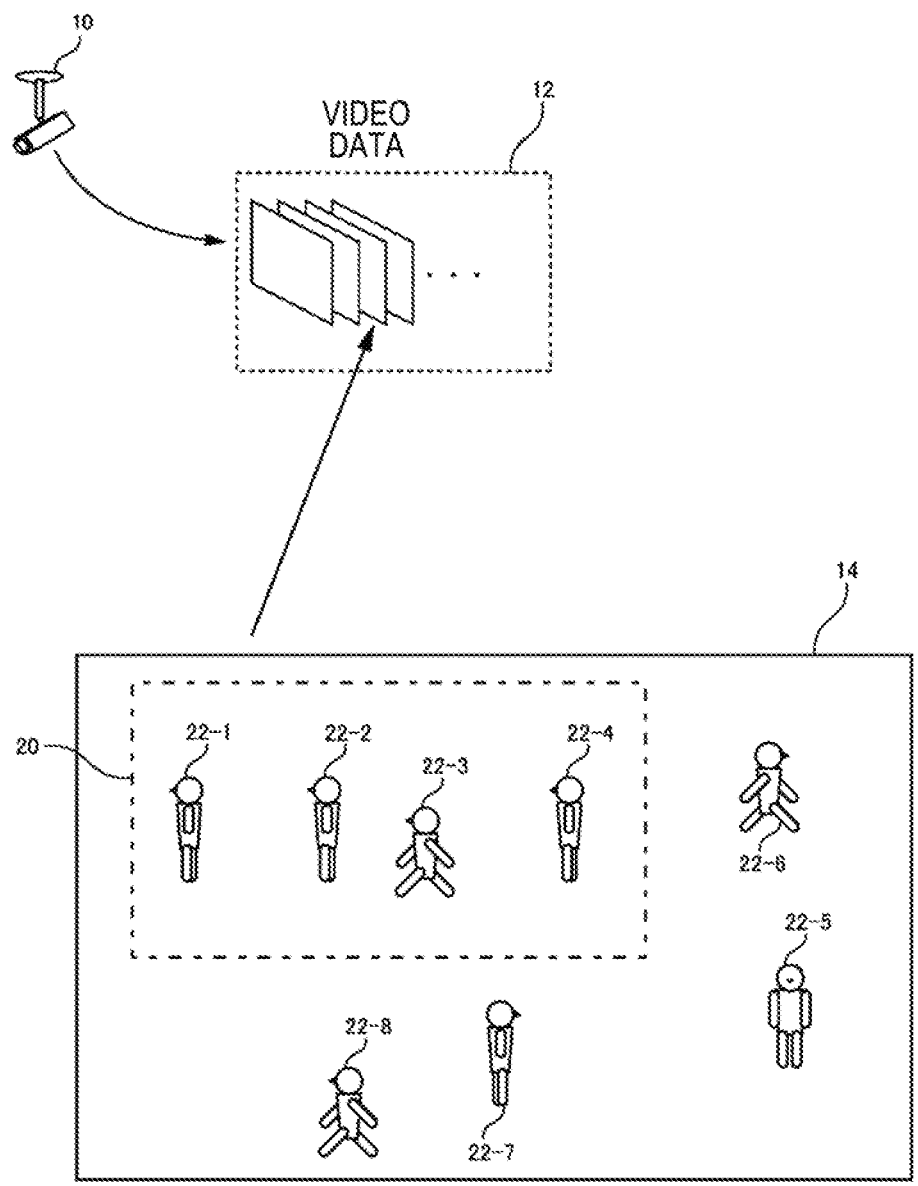
FIG. 1 is a diagram for describing an operation of an information processing apparatus of Example Embodiment 1.

FIG. 1 is a diagram for describing an operation of an information processing apparatus (information processing apparatus 2000 in FIG. 3 described below) of Example Embodiment 1. The operation of the information processing apparatus 2000 in the following description is an illustration for easy understanding of the information processing apparatus 2000. The operation of the information processing apparatus 2000 is not limited to the following example. Details and variations of the operation of the information processing apparatus 2000 will be described below.

The information processing apparatus 2000 detects leaving of an object 22 from an object queue 20 (the object queue 20 captured by a camera 10) that is included in video data 12 generated by the camera 10. The object queue 20 is a queue configured with objects 22. In FIG. 1, the object queue 20 is configured with an object 22-1 to an object 22-4 among the object 22-1 to an object 22-8 included in a video frame 14. The video frame 14 is one of time-series captured images constituting the video data 12.

Any queue can be handled as the object queue 20. For example, the object queue 20 is a queue of persons formed at an immigration checkpoint of an airport, a bank ATM, a checkout of a store, or a platform of public transportation. In this case, the objects 22 are persons. Besides, for example, the object queue 20 is a queue of vehicles waiting for using a parking lot. In this case, the objects 22 are vehicles. In FIG. 1, the objects 22 are persons.

A meaning of a term "leaving" in the present specification will be described. The object 22 included in the object queue 20 then may not be included in the object queue 20 anymore. This change is broadly divided into (1) a change in which the object 22 lines up in the object queue 20 and then, exits from the top and (2) a change in which the object 22 exits the object queue 20 in the middle of lining up in the object queue 20.

Differences between (1) and (2) will be described using a queue of persons formed ahead of a checkout of a store as an example. A case of (1) is a case where a "person lining up in the queue proceeds and reaches the top of the queue and then, exits the queue from the top of the queue because the checkout is vacant, and purchases a product at the checkout". On the other hand, a case of (2) is a case where a "person lining up in the queue exits the queue from the middle of the queue and does not purchase a product".

In the present specification, "(2) the change in which the object 22 exits the object queue in the middle of lining up in the object queue 20" will be referred to as "leaving". This can also be referred to as "mid-leaving". It should be noted that (1) can be referred to as "top-leaving" in contrast to the mid-leaving. Hereinafter, a case where "leaving" is simply used or a case where "mid-leaving" is used represents (2). On the other hand, a case where "top-leaving" represents (1).

The information processing apparatus 2000 determines whether or not the object 22 included in the object queue 20 has left the object queue 20 (hereinafter, referred to as a "leaving determination"). The object 22 that is an object on which the determination is to be performed by the information processing apparatus 2000 will be referred to as an object to be determined. For example, the information processing apparatus 2000 detects leaving of one or more objects 22 from the object queue 20 by sequentially performing the leaving determination on each object 22 included in the object queue 20 as the object to be determined.

In order to perform the leaving determination on the object to be determined, the information processing apparatus 2000 infers a behavior of the object to be determined based on a relationship between the object to be determined and another object 22 included in the object queue 20. The information processing apparatus 2000 determines whether or not the object to be determined has left the object queue 20 on the basis of the inferred behavior.

The behavior of the object to be determined based on the relationship between the object to be determined and the other object 22 included in the object queue 20 represents a global behavior (a motion or a state) of the object to be determined related to the object queue 20. Hereinafter, the behavior of the object to be determined based on the relationship between the object to be determined and the other object 22 included in the object queue 20 will be also referred to as a "global behavior of the object to be determined".

The global behavior of the object to be determined may vary even in a situation where a behavior (a behavior focused on only the object to be determined without considering the relationship between the object to be determined and the other object 22) of the object to be determined seen as an individual is the same. The behavior of a certain object focused on the object as an individual without considering the relationship between the object to be determined and the other object 22 will be referred to as a "local behavior of the object".

Figure 2:
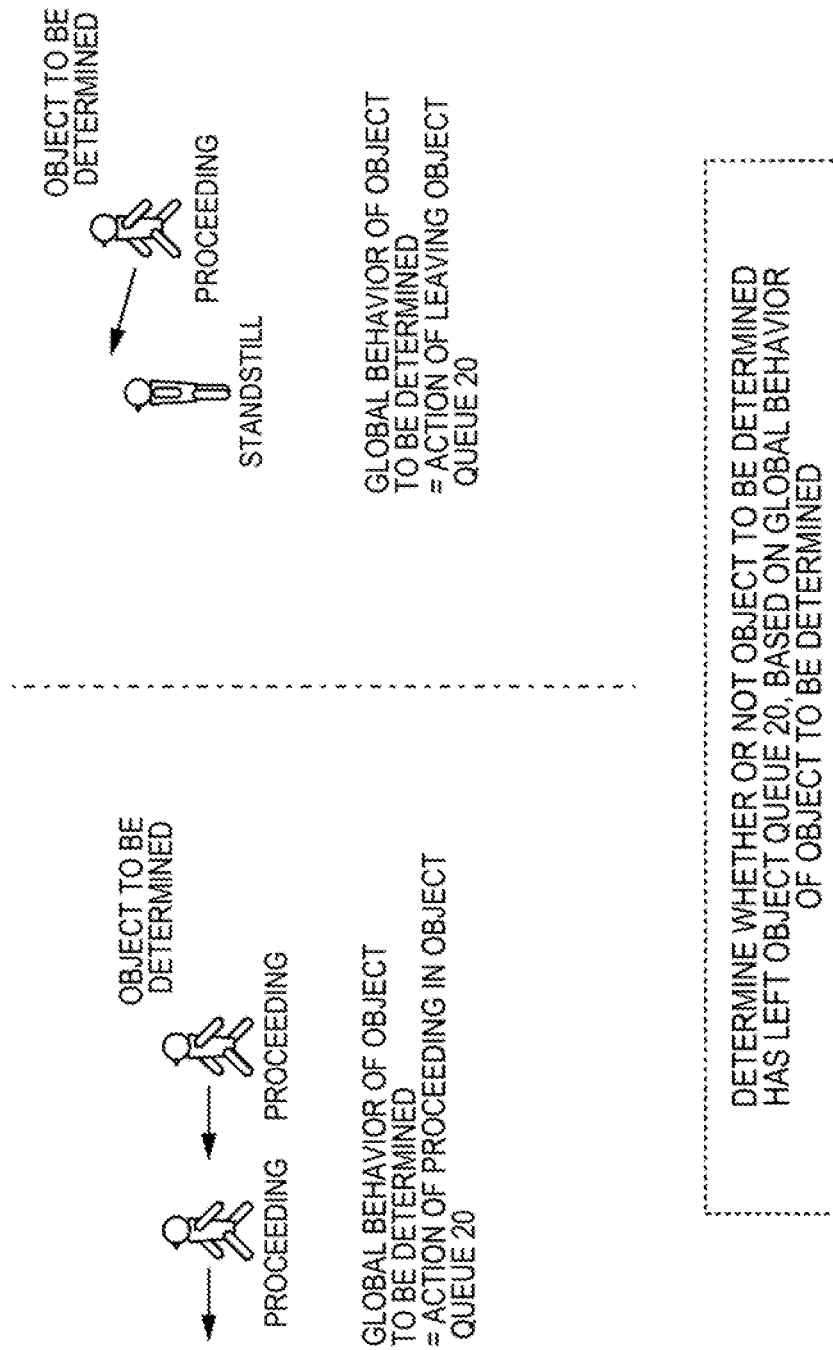
FIG. 2 is a diagram illustrating a local behavior and a global behavior of an object to be determined.

FIG. 2 is a diagram illustrating the local behavior and the global behavior of the object to be determined. In each of the examples of the left-hand queue and the right-hand queue in FIG. 2, the object to be determined is proceeding. Thus, the local behavior "proceeding" of the object to be determined is common.

On the other hand, between these two examples, the global behavior of the object to be determined is different. In the example of the left queue in FIG. 2, not only the object to be determined but also the object ahead of the object to be determined is proceeding. Thus, when the behavior of the object to be determined is globally seen, it is said that there is a high likelihood of the object to be determined proceeding in accordance with a motion of the whole object queue 20. Thus, the global behavior of the object to be determined can also be represented as an "action of proceeding in the object 20".

In the example of the right queue in FIG. 2, the object to be determined is proceeding. On the other hand, the object ahead of the object to be determined is at a standstill. In this case, in a case where the behavior of the object to be determined is globally seen, it is said that there is a high likelihood that the behavior of the object to be determined is not proceeding in accordance with the motion of the whole object queue 20 and is proceeding so as to exit the object queue 20 (that is, leaving). Thus, the global behavior of the object to be determined can also be represented as an "action of leaving the object queue 20".

As in the latter case, when the global behavior of the object to be determined is focused, a situation where there is a high likelihood of leaving of the object to be determined may be recognized. Therefore, the information processing apparatus 2000 of the present example embodiment performs the leaving determination on the object to be determined by considering the global behavior of the object to be determined. Accordingly, leaving of the object to be determined can be detected earlier with high accuracy compared to that in a case where the global behavior of the object to be determined is not considered.

Hereinafter, the information processing apparatus 2000 of the present example embodiment will be described in further detail.

<Example of Functional Configuration of Information Processing Apparatus 2000>

Figure 3:
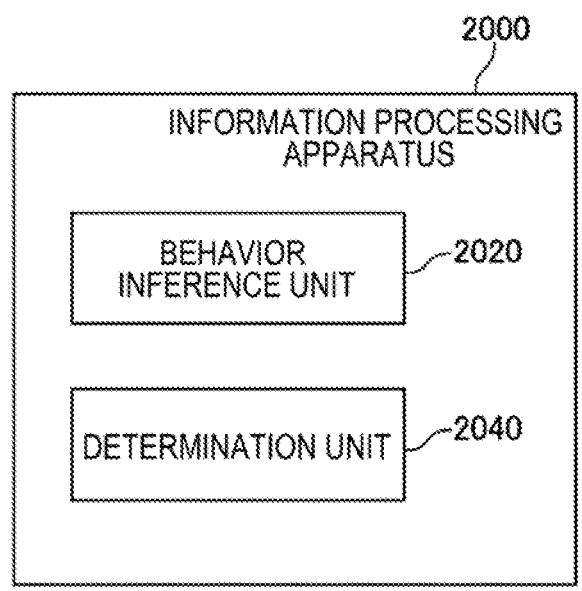
FIG. 3 is a diagram illustrating a configuration of the information processing apparatus of Example Embodiment 1.

FIG. 3 is a diagram illustrating a configuration of the information processing apparatus 2000 of Example Embodiment 1. For example, the information processing apparatus 2000 includes a behavior inference unit 2020 and a determination unit 2040. Using the video frame 14 (captured image) in which the object queue 20 is included, the behavior inference unit 2020 infers the global behavior of the object to be determined on the basis of the relationship between the object to be determined included in the video frame 14 and the other object 22 in the object queue 20. The determination unit 2040 performs the leaving determination on the object to be determined on the basis of the inferred global behavior of the object to be determined.

<Hardware Configuration of Information Processing Apparatus 2000>

Each functional configuration unit of the information processing apparatus 2000 may be implemented by hardware (example: a hardwired electronic circuit) implementing each functional configuration unit, or may be implemented by a combination of hardware and software (example: a combination of an electronic circuit and a program controlling the electronic circuit). Hereinafter, a case where each functional configuration unit of the information processing apparatus 2000 is implemented by a combination of hardware and software will be described.

Figure 4:
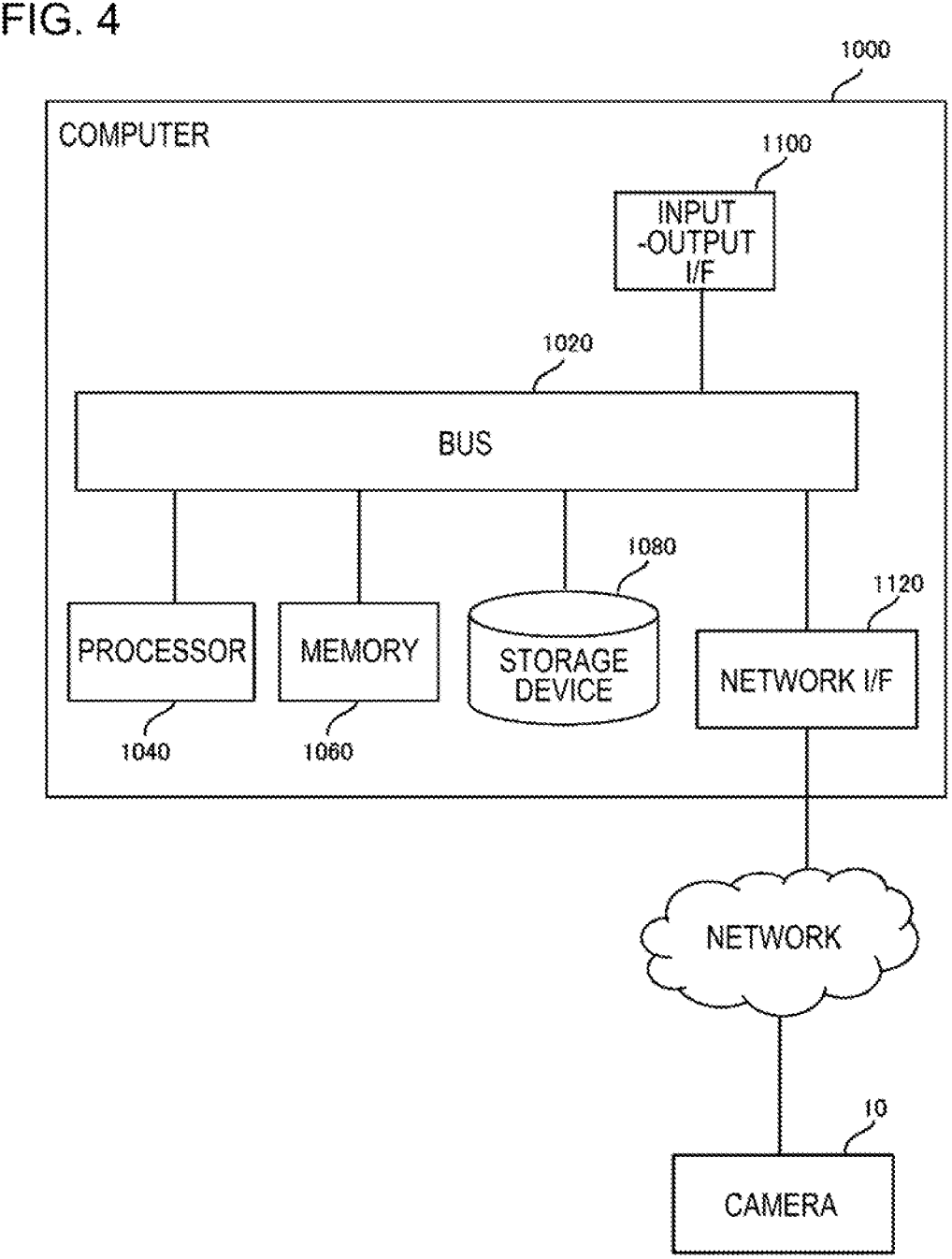
FIG. 4 is a diagram illustrating a computer for implementing the information processing apparatus.

FIG. 4 is a diagram illustrating a computer 1000 for implementing the information processing apparatus 2000. The computer 1000 is any computer. For example, the computer 1000 is a personal computer (PC), a server machine, a tablet terminal, or a smartphone. Besides, for example, the computer 1000 may be the camera 10. The computer 1000 may be a dedicated computer designed to implement the information processing apparatus 2000 or may be a general-purpose computer.

The computer 1000 includes a bus 1020, a processor 1040, a memory 1060, a storage device 1080, an input-output interface 1100, and a network interface 1120. The bus 1020 is a data transfer path for transmission and reception of data among the processor 1040, the memory 1060, the storage device 1080, the input-output interface 1100, and the network interface 1120. A method of connecting the processor 1040 and the like to each other is not limited to bus connection. The processor 1040 corresponds to various processors such as a central processing unit (CPU) and a graphics processing unit (GPU). The memory 1060 is a main storage device that is configured with a random access memory (RAM) or the like. The storage device 1080 is an auxiliary storage device that is configured with a hard disk, a solid state drive (SSD), a memory card, a read only memory (ROM), or the like.

The input-output interface 1100 is an interface for connecting the computer 1000 to input-output devices. The network interface 1120 is an interface for connecting the computer 1000 to a communication network. For example, the communication network is a local area network (LAN) or a wide area network (WAN). A method of connecting the network interface 1120 to the communication network may be wireless connection or may be wired connection.

For example, the computer 1000 is communicably connected to the camera 10 through the network. A method of communicably connecting the computer 1000 to the camera 10 is not limited to connection through the network. In addition, the computer 1000 may not be communicably connected to the camera 10.

The storage device 1080 stores a program module that implements each functional configuration unit (the behavior inference unit 2020 and the determination unit 2040) of the information processing apparatus 2000. The processor 1040 implements a function corresponding to each program module by reading each program module into the memory 1060 and executing the program module.

It should be noted that the computer 1000 may be implemented using a plurality of computers. For example, the behavior inference unit 2020 and the determination unit 2040 can be implemented by different computers. In this case, the program module stored in the storage device of each computer may be only a program module corresponding to the functional configuration unit implemented by the computer.

<Camera 10>

The camera 10 is any camera that generates the video data 12 by generating the time-series video frame 14 by repeatedly performing capturing. For example, the camera 10 is a surveillance camera that is disposed for surveillance of a determined facility, road, and the like.

As described above, the computer 1000 implementing the information processing apparatus 2000 may be the camera 10. In this case, the camera 10 performs the leaving determination on the object to be determined by analyzing the video frame 14 generated by the camera 10. As the camera 10 having such a function, for example, a camera called an intelligent camera, a network camera, or an Internet Protocol (IP) camera can be used.

It should be noted that not all functions of the information processing apparatus 2000 may be implemented by the camera 10, and only a part of the functions of the information processing apparatus 2000 may be implemented by the camera 10. For example, a function of detecting the object 22 from the video frame 14 is implemented by the camera 10, and a function of performing the leaving determination on the object to be determined by analyzing the action and the like of each detected object 22 is implemented by a server apparatus. In this case, the server apparatus acquires various information (detection information described later) such as the position and an image feature of the detected object 22 from the camera 10. In this case, the server apparatus may not acquire the video frame 14.

<Method of Acquiring Video Frame 14>

The information processing apparatus 2000 acquires one or more video frames 14 to be processed. Various methods of acquiring the video frame 14 by the information processing apparatus 2000 are present. For example, the information processing apparatus 2000 receives the video frame 14 transmitted from the camera 10. Alternatively, for example, the information processing apparatus 2000 accesses the camera 10 and acquires the video frame 14 stored in the camera 10.

It should be noted that the camera 10 may store the video frame 14 in a storage device that is disposed outside the camera 10. In this case, the information processing apparatus 2000 acquires the video frame 14 by accessing the storage device. Thus, in this case, the information processing apparatus 2000 and the camera 10 may not be communicably connected.

In a case where a part or all of the functions of the information processing apparatus 2000 are implemented by the camera 10, the information processing apparatus 2000 acquires the video frame 14 generated by the information processing apparatus 2000. In this case, for example, the video frame 14 is stored in a storage device (for example, the storage device 1080) inside the information processing apparatus 2000. Therefore, the information processing apparatus 2000 acquires the video frame 14 from the storage device.

A timing at which the information processing apparatus 2000 acquires the video frame 14 is not limited. For example, each time a new video frame 14 constituting the video data 12 is generated by the camera 10, the information processing apparatus 2000 acquires the newly generated video frame 14. Besides, for example, the information processing apparatus 2000 may periodically acquire a video frame 14 that is not acquired. For example, in a case where the information processing apparatus 2000 acquires the video frame 14 once in one second, the information processing apparatus 2000 collectively acquires a plurality of video frames 14 (for example, 30 video frames 14 in a case where a frame rate of the video data 12 is 30 frames/second (fps)) that are generated in one second by the camera 10.

The information processing apparatus 2000 may acquire all video frames 14 constituting the video data 12 or may acquire only a part of the video frames 14. In the latter case, for example, the information processing apparatus 2000 acquires the video frames 14 generated by the camera 10 at a ratio of one to a predetermined number.

<Detection and Management of Object Queue 20>

As a premise for performing the leaving determination on the object to be determined, the information processing apparatus 2000 detects and manages the object queue 20. For example, the management of the object queue 20 is implemented by generating and updating tracking information for the object 22 included in the object queue 20. Hereinafter, the object 22 included in the object queue 20 will be referred to as an object to be tracked.

The tracking information shows various information related to the object to be tracked. For example, the tracking information shows a position, a size, a distance to the object queue 20, and identification information for each object to be tracked. The identification information is an identifier or the like that is assigned to each object to be tracked in order to discriminate objects to be tracked from each other. Furthermore, the tracking information shows local information that represents a local behavior of the object to be tracked, and global information that represents a global behavior of the object to be tracked.

The position of the object to be tracked may be represented as a position on the video frame 14 (for example, coordinates using the upper left end of the video frame 14 as an origin) or may be represented as real world coordinates. Existing technologies can be used as a technology for computing the real world coordinates of an object included in an image generated by a camera. For example, the real world coordinates of the object to be tracked can be computed from the position on the video frame 14 using parameters representing a position and a posture acquired by calibrating the camera. Similarly, the distance between the object to be tracked and the object queue 20 may be a distance in the video frame 14 or a distance in the real space. It should be noted that a specific method of determining the distance between the object to be tracked and the object queue 20 will be described later.

Information shown in the tracking information is not limited to the above information. For example, the tracking information may further show a position from the top of the object queue 20, an elapsed time from registration in the tracking information, an inferred waiting time, an image feature, and an image region for each object 22. The inferred waiting time of the object 22 means a time required until the top-leaving of the object 22 from the current time point.

For example, a feature value describing a size, a shape, or a color or a pattern (in a case of a person, a color or a pattern of clothes) of a surface of the object to be tracked can be used as the image feature of the object to be tracked. More specifically, a feature value such as a color histogram, a color layout, an edge histogram, or a Gabor feature can be used. In addition, for example, a shape descriptor standardized in MPEG-7 can be used as the feature value representing the shape of the object to be tracked.

The image region of the object to be tracked is information that defines the image region representing the object to be tracked. For example, in a case where a rectangle that is circumscribed about the object to be tracked is used as the image region representing the object to be tracked, the image region is information (for example, coordinates of the upper left end and the lower right end) defining the rectangle.

FIG. 5 is a diagram illustrating the tracking information in a table format. The table in FIG. 5 will be referred to as a table 200. The table 200 shows a tracking ID 202, a position 204, a distance 206, local information 208, global information 210, and an image feature 212. The tracking ID 202 shows an identifier assigned to the object to be tracked. The distance 206 shows the distance between the object to be tracked and the object queue 20.

The tracking information is stored in a storage region. For example, the storage region is the storage device 1080 in FIG. 3. The storage region in which the tracking information is stored is not limited to the storage region disposed inside the information processing apparatus 2000. For example, the tracking information may be stored in a storage region such as the server apparatus or a network attached storage (NAS) outside the information processing apparatus 2000. In this case, the information processing apparatus 2000 transmits the generated tracking information to the server apparatus or the like.

Hereinafter, generation and update of the tracking information will be described. The generation of the tracking information means that when the object queue 20 is detected from the video frame 14, new tracking information is generated for the object queue 20. Using the video frame 14 in which the object queue 20 is detected, the information processing apparatus 2000 generates the tracking information using each object 22 included in the object queue 20 in the video frame 14 as the object to be tracked.

The update of the tracking information means that the object 22 is detected from the video frame 14 that is generated after the detection of the object queue 20, and a content of the tracking information is changed on the basis of information related to the detected object 22. For example, a change in position and the like of the object to be tracked is reflected on the tracking information. In addition, information related to the object 22 newly added to the object queue 20 is added to the tracking information. Furthermore, information related to the object 22 that has left the object queue 20 is deleted from the tracking information. The information related to the object 22 having left the object queue 20 may remain in the tracking information. In this case, the tracking information is configured such that the object 22 belonging to the object queue 20 can be differentiated from the object 22 having left the object queue 20 (for example, a flag is provided).

Figure 6:
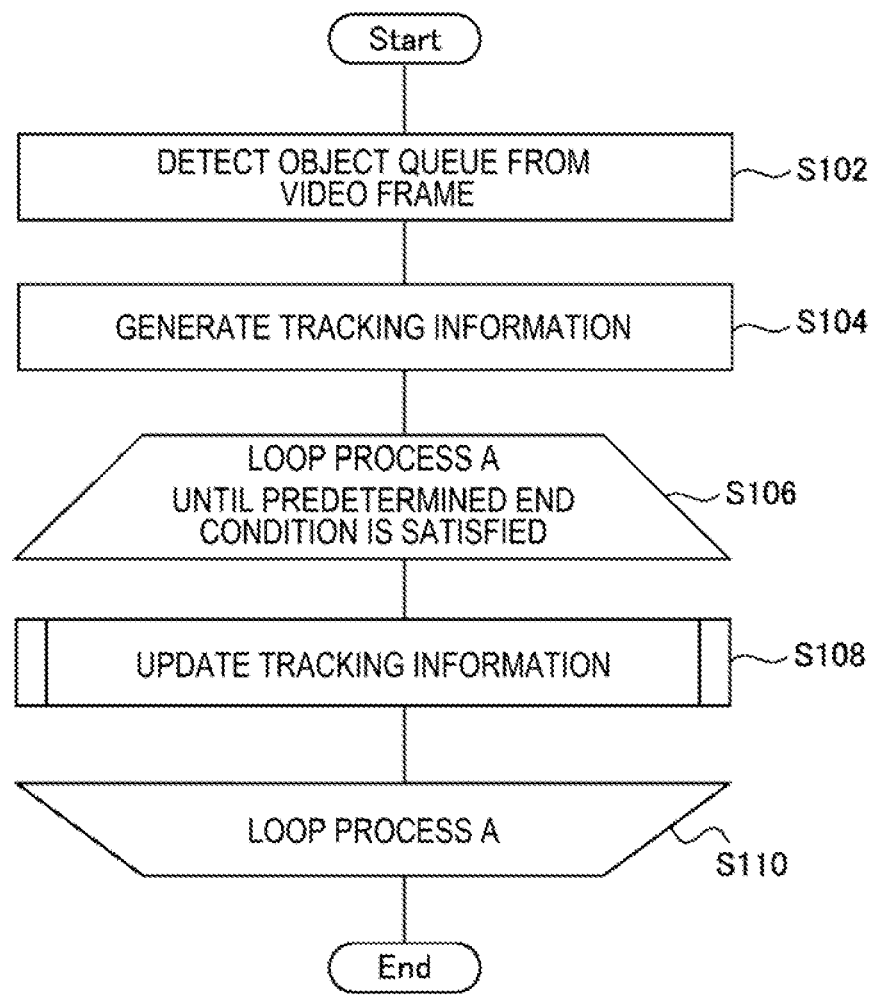
FIG. 6 is a flowchart illustrating a summary of a flow of process executed by the information processing apparatus.

FIG. 6 is a flowchart illustrating a summary of a flow of process executed by the information processing apparatus 2000. The information processing apparatus 2000 detects the object queue 20 from the video frame 14 (S102). The information processing apparatus 2000 generates the tracking information using the objects 22 included in the detected object queue 20 as the objects to be tracked (S104).

S106 to S110 correspond to a loop process A that is repeatedly executed until a predetermined end condition is satisfied. In S106, in a case where the predetermined end condition is satisfied, the information processing apparatus 2000 ends the process in FIG. 6. On the other hand, in a case where the predetermined end condition is not satisfied, the process in FIG. 6 proceeds to S108.

In S108, the information processing apparatus 2000 updates the tracking information. S110 is the end of the loop process. Thus, the process in FIG. 6 proceeds to S106. By repeatedly executing the loop process A until the predetermined end condition is satisfied, the tracking information is repeatedly updated. In addition, each time the tracking information is updated, the leaving determination is performed for each object to be tracked.

The predetermined end condition is not limited. For example, the predetermined end h condition is that the number of objects 22 included in the object queue 20 is 0, that is, the object queue 20 is not present. In this case, the information processing apparatus 2000 executes the process in FIG. 6 again from the beginning for the video data 12 configured with the video frame 14 that is not set to be processed yet. By doing so, detection of the newly formed object queue and detection of a change of the object queue 20 are performed.

<<Detection of Object Queue 20>>

The information processing apparatus 2000 detects the object queue 20 from the video data 12 by sequentially performing image analysis on a plurality of time-series video frames 14 constituting the video data 12. The video frame 14 used in the detection of the object queue 20 may be a part of the video frames 14 constituting the video data 12. For example, the information processing apparatus 2000 performs the image analysis on the time-series video frames 14 constituting the video data 12 at a ratio of one to a predetermined number.

In order to detect the object queue 20, the information processing apparatus 2000 detects the object 22 from the video frame 14. Various known technologies can be used as a technology for detecting the object 22 from the video frame 14. For example, the information processing apparatus 2000 includes a detector that is caused to learn the image feature of the object to be detected from the video frame 14. For example, in a case where a person is handled as the object 22, the detector learns an image feature representing characteristics of a person. In addition, in a case where a vehicle is handled as the object 22, the detector learns an image feature representing characteristics of a vehicle.

The detector detects an image region matching the learned image feature from the video frame 14 as a region (hereinafter, an object region) representing the object. The detection of the object region means that the object represented by the object region is detected. For example, a detector that performs detection based on a histograms of oriented gradients (HOG) feature or a detector that uses a convolutional neural network (CNN) can be used as the detector representing the object 22. Note that the detector may be learned to detect the region of the whole object or may be learned to detect a part of the region of the object (for example, a head portion of a person).

The detector outputs information (hereinafter, detection information) related to the detected object 22. For example, the detection information shows a position, a size, identification information, an image feature, and an image region of the detected object 22. The identification information is an identifier or the like for discriminating the objects 22 detected from the video frame 14 from each other. In addition, after the object queue 20 is detected, the detector may compute a distance between the object 22 and the object queue 20 and include the distance in the detection information.

Various existing technologies can be used as a technology for detecting the formation of the object queue 20 by the object 22 included in the video frame 14. A region (hereinafter, a queue area) in which the object queue 20 is formed may be determined as a part of the image region of the video frame 14. In this case, depending on the detection of one or more objects 22 in the queue area, the information processing apparatus 2000 determines that the object queue 20 is formed by the one or more objects 22.

A method of defining the queue area can be implemented using various known methods of specifying a region in the captured image generated by the camera. For example, the information processing apparatus 2000 receives an input operation of specifying the queue area from a user. For example, this input operation is an operation of drawing an area in which the object queue 20 is formed on the video frame 14 using any figure such as a line, a polygon, or a circle. Besides, for example, the specifying of the queue area may be implemented by specifying coordinates (for example, in a case where the queue area is a rectangle, the coordinates of the upper left end and the lower right end) for determining the queue area by a keyboard input.

The information processing apparatus 2000 may detect the object 22 using the whole image region of the video frame 14 as a target or may detect the object 22 using only a part of the image region as a target. For example, in a case where the queue area is defined, the information processing apparatus 2000 may detect the object 22 from only the queue area as a target or may detect the object 22 from only the queue area and its surrounding area (for example, an area obtained by enlarging the queue area at a predetermined magnification) as a target.

Figure 7:
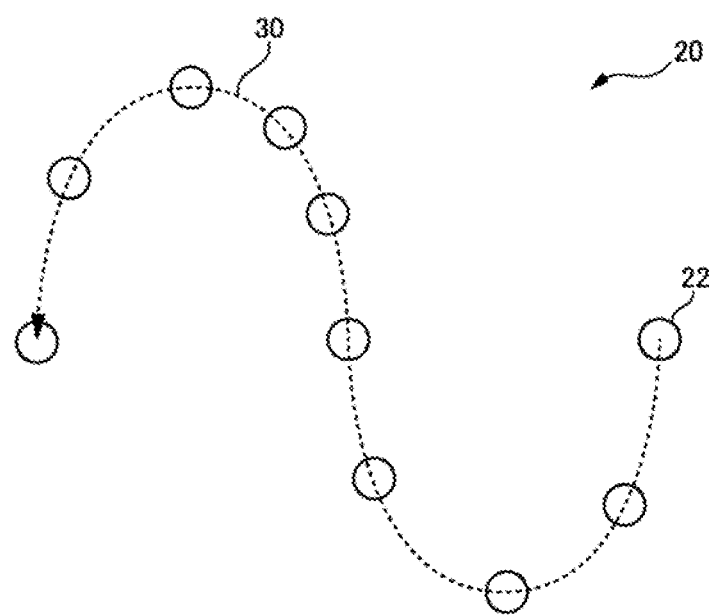
FIG. 7 is a diagram illustrating an object queue having a non-linear shape.

The shape of the object queue 20 may be linear or may not be linear. The latter case is a case where the object queue 20 is curved in an S shape or is folded in the middle of the object queue 20. FIG. 7 is a diagram illustrating the object queue 20 having a non-linear shape. In a case where the shape of the object queue 20 is not linear, for example, a queue line 30 is defined along the object queue 20, and a state, a movement direction, and the like of the object queue 20 are defined along the queue line 30. The queue line represents (is similar to) the shape of the object queue 20 by a line.

For example, the distance between the object 22 and the object queue 20 is defined using the queue line. Specifically, a length of a perpendicular line extending from the object 22 to the queue line of the object queue 20 is handled as the distance between the object 22 and the object queue 20.

<<Flow of Process of Updating Tracking Information>>

Figure 8:
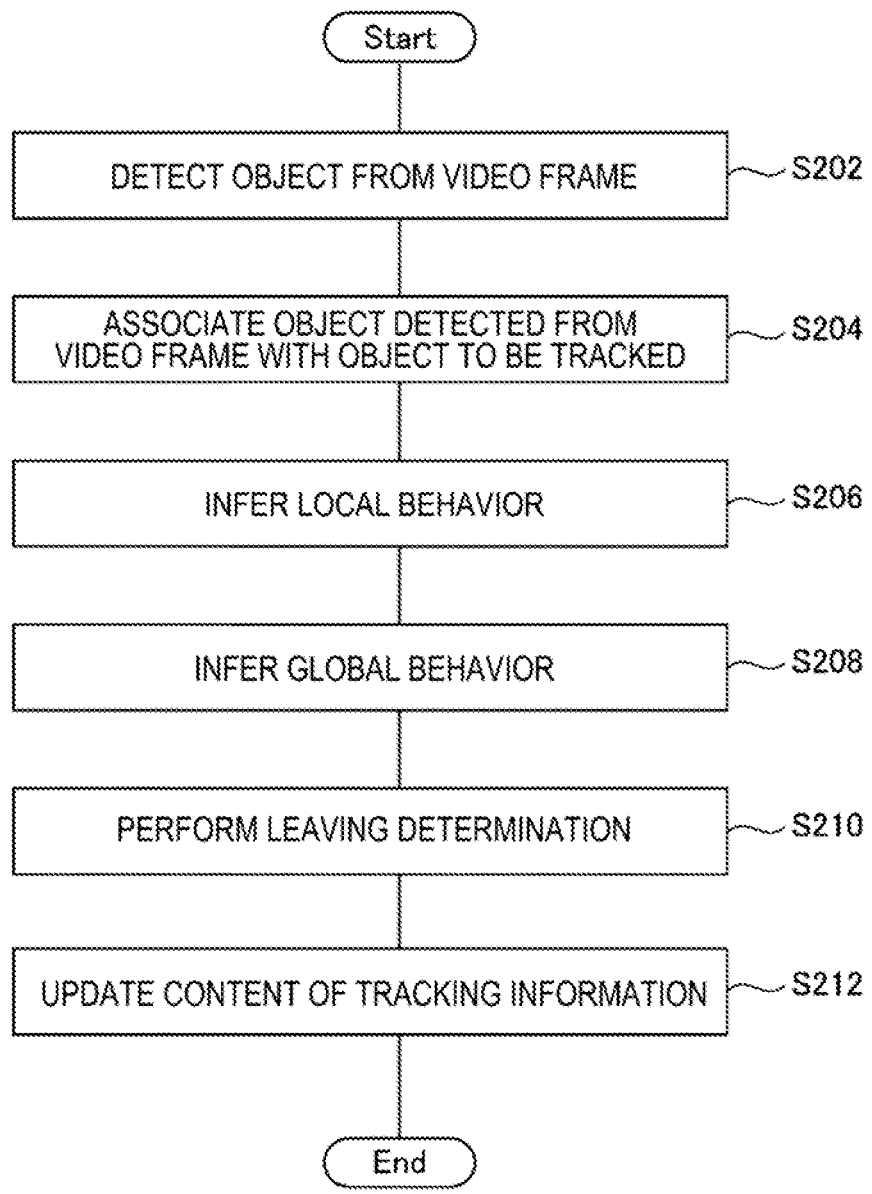
FIG. 8 is a flowchart illustrating a flow of process of updating the tracking information.

FIG. 8 is a flowchart illustrating a flow of process of updating the tracking information. FIG. 8 is a detailed process executed in S108 in FIG. 6.

The information processing apparatus 2000 performs the process illustrated in FIG. 8 using each video frame 14 after the video frame 14 in which the object queue 20 is detected as a target.

The information processing apparatus 2000 detects the object 22 from the video frame 14 (S202). The information processing apparatus 2000 associates the object 22 detected from the video frame 14 with the object to be tracked (S204). Existing technologies can be used as a technology for associating the object detected from the video frame 14 with the object to be tracked (the object detected from a previous video frame 14) shown in the tracking information.

The information processing apparatus 2000 infers the local behavior of each object to be tracked (S206). The information processing apparatus 2000 infers the global behavior of each tracking target (S208). The information processing apparatus 2000 performs the leaving determination for each object to be tracked (S210).

The information processing apparatus 2000 updates the content of the tracking information (S212). Existing technologies can be used as a technology for updating the content of the tracking information. For example, the information processing apparatus 2000 deletes the object to be tracked (the object to be tracked performing the top-leaving or the mid-leaving) that is not included in the object queue 20 anymore from the tracking information. As described above, the information related to the object to be tracked that is not included in the object queue 20 anymore may remain in the tracking information. In addition, the information processing apparatus 2000 adds the object 22 (the object 22 that is newly added to the object queue 20 from the tail of the object queue 20, or the object 22 that cuts in the object queue 20) that is newly included in the object queue 20 to the tracking information as a new object to be tracked. Furthermore, the information processing apparatus 2000 changes the information (the position and the like) of the object to be tracked that is shown in the tracking information and is continuously included in the object queue 20 using the detection information of the object 22 associated with the object to be tracked.

<Inference of Local Behavior: S206>

The information processing apparatus 2000 infers the local behavior for each object to be tracked. For example, the local behavior of the object to be tracked is defined as a state (hereinafter, a motion state) related to a motion of the object to be tracked. For example, the motion state of the object to be tracked is any one of a proceeding state, a receding state, and a standstill state.

For example, the local behavior of the object to be tracked detected from a certain video frame 14 can be inferred from a change in position of the object to be tracked in a predetermined period in the past including a generation time point of the video frame 14. For example, the information processing apparatus 2000 computes a vector connecting the position of the object to be tracked detected from a video frame 14-1 to the position of the object to be tracked detected from an immediately previously generated video frame 14-2 as a movement vector of the object to be tracked in the video frame 14-1. The local behavior of the object to be tracked in the video frame 14-1 is inferred on the basis of a direction of the movement vector and a magnitude (motion amount) of the movement vector.

For example, the information processing apparatus 2000 determines whether or not the object to be tracked is at a standstill on the basis of the magnitude of the movement vector of the object to be tracked. Specifically, in a case where the magnitude of the movement vector is less than or equal to a reference value, the information processing apparatus 2000 determines that the object to be tracked is at a standstill. The reference value may be zero or a value greater than zero. In the former case, the local behavior of the object to be tracked is handled as the standstill state only in a case where the object to be tracked is not moving. On the other hand, in the latter case, even in a case where the object to be tracked is moving, the local behavior of the object to be tracked is handled as the standstill state in a case where the motion amount is less than or equal to the reference value. It should be noted that the reference value may be fixedly set in advance in the information processing apparatus 2000 or may be specified by the user of the information processing apparatus 2000.

The reference value may be a statically decided value or a dynamically decided value. In the former case, the reference value is stored in advance in a storage device that can be accessed from the information processing apparatus 2000. In the latter case, the information processing apparatus 2000 dynamically computes the reference value. For example, the information processing apparatus 2000 computes a moving average of the motion amount in the past in a time direction and uses a computed value as the reference value.

For the object to be tracked that is not at a standstill, a determination as to whether or not the object to be tracked is in the proceeding state or the receding state is performed on the basis of the direction of the movement vector. For example, the information processing apparatus 2000 computes a component of the movement vector of the object to be tracked that is parallel to a proceeding direction of the object queue 20. In a case where the component is the same as the proceeding direction of the object queue 20, the information processing apparatus 2000 sets the local behavior of the object to be tracked to the "proceeding state". On the other hand, in a case where the component is in a direction opposite to the proceeding direction of the object queue 20, the information processing apparatus 2000 sets the local behavior of the object to be tracked to the "receding state".

<Inference of Global Behavior: S208>

The behavior inference unit 2020 infers the global behavior for each object to be tracked. The behavior inference unit 2020 infers the global behavior of the object to be tracked on the basis of the local behavior of the object to be tracked and the local behavior of another object to be tracked. The global behavior of the object to be tracked represents a meaning of the local behavior of the object to be tracked on the basis of a relationship between the object to be tracked and the other object to be tracked.

For example, the information processing apparatus 2000 infers the global behavior of the object to be tracked on the basis of a combination of the local behavior of the object to be tracked and the local behavior of the other object to be tracked (for example, the object to be tracked positioned immediately ahead or behind) adjacent to the object to be tracked. FIG. 9 is a first diagram illustrating a table showing the global behavior of the object to be tracked. FIG. 9 illustrates a global behavior of an object to be tracked A in association with a combination of a local behavior of the object to be tracked A and a local behavior of an object to be tracked B. The object to be tracked B is the object to be tracked that is positioned immediately ahead of the object to be tracked A.

For example, a row in which the local behavior of the object to be tracked A shows the "proceeding state" is focused. In this case, in a case where the local behavior of the object to be tracked B is the "proceeding state", the global behavior of the object to be tracked A is "proceeding in the queue". Since both of the object to be tracked A and the object to be tracked B immediately ahead thereof are proceeding, the object to be tracked A can be inferred to be proceeding in accordance with the whole object queue 20.

On the other hand, in a case where the local behavior of the object to be tracked B is the "standstill state", the global behavior of the object to be tracked A is a "leaving action". Since the object to be tracked A is proceeding regardless of the standstill of the object to be tracked B immediately ahead, the object to be tracked A can be inferred to be proceeding in order to leave the object queue 20.

In addition, in a case where the object to be tracked A is at a standstill and the object to be tracked B is proceeding, it is said that the object to be tracked A is in a state where the object to be tracked A is at a standstill but can proceed in the object queue 20. Thus, the global behavior of the object to be tracked A is "being able to proceed in the queue".

As a target for comparison with the object to be determined, instead of one object to be tracked lining up immediately ahead thereof, a predetermined number (two or more) of objects to be tracked lining up ahead of the object to be determined may be used. In this case, for example, the behavior inference unit 2020 handles the predetermined number of objects to be tracked as one group and infers a local behavior of the group. The group simply means a collection of a plurality of objects to be tracked and does not require an attribute or the like common to the objects to be tracked.

For example, the global behavior of the object to be determined that is determined by the local behavior of the object to be determined and the local behavior of the group of objects to be tracked lining up ahead thereof can be represented by replacing the "object to be tracked B" with the "group of objects to be tracked lining up ahead of the object to be tracked A" in FIG. 9.

For example, the local behavior of the group is determined on the basis of the local behavior of each object to be tracked included in the group. For example, the behavior inference unit 2020 sets the local behavior of the group to "standstill" in a case where a predetermined ratio or more of objects to be tracked are at a standstill among the objects to be tracked included in the group. Similarly, the behavior inference unit 2020 sets the local behavior of the group to "proceeding" in a case where a predetermined ratio or more of objects to be tracked are proceeding, and sets the local behavior of the group to "receding" in a case where a predetermined ratio or more of objects to be tracked are receding.

Figure 10:
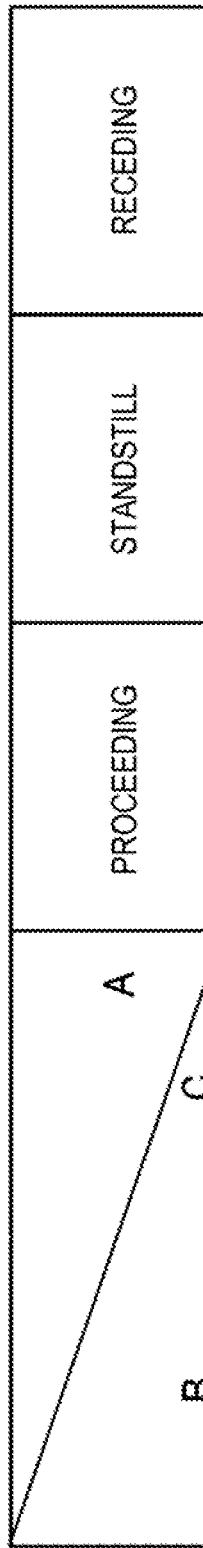
FIG. 10 is a second diagram illustrating a table showing the global behavior of the object to be tracked.

The global behavior of the object to be determined may be determined by considering not only the other object to be tracked lining up immediately ahead of the object to be determined but also the other object to be tracked lining up immediately behind the object to be determined. FIG. 10 is a second diagram illustrating a table showing the global behavior of the object to be tracked. The object to be tracked B is positioned immediately ahead of the object to be tracked A, and an object to be tracked C is positioned immediately behind the object to be tracked A.

FIG. 10 illustrates the global behavior of the object to be tracked A in association with a combination of local behaviors of the objects to be tracked A, B, and C. For example, a row in which the object to be tracked B is in the "proceeding state" and the object to be tracked C is in the "proceeding state" is focused. In this case, in a case where the local behavior of the object to be tracked A is the "proceeding state", the global behavior of the object to be tracked A is "proceeding in the queue". This is the same as a case where the object to be tracked A is in the "proceeding state" and the object to be tracked B is in the "proceeding state" in FIG. 9.

By further reflecting the local behavior of the object to be tracked C lining up immediately behind the object to be tracked A, the global behavior of the object to be tracked A can be inferred with higher accuracy.

<Detection of Leaving: S210>

The determination unit 2040 performs the leaving determination for each object to be tracked. As described above, the object for which the leaving determination is to be performed is referred to as the object to be determined.

The determination unit 2040 computes a likelihood of the object to be determined having left the object queue 20 on the basis of the global behavior of the object to be determined. The computed likelihood will be referred to as a leaving likelihood. The determination unit 2040 determines whether or not the object to be determined has left the object queue 20 on the basis of the leaving likelihood. For example, in a case where the leaving likelihood computed for a certain object to be determined is greater than or equal to a predetermined value, the determination unit 2040 determines that the object to be determined has left the object queue 20. On the other hand, in a case where the leaving likelihood computed for a certain object to be determined is less than the predetermined value, the determination unit 2040 determines that the object to be determined does not leave the object queue 20.

Besides, for example, the determination unit 2040 may determine that the object to be determined has left the object queue 20 only in a case where a situation where the leaving likelihood of the object to be determined is greater than or equal to the predetermined value continues for a predetermined period. Besides, for example, the determination unit 2040 may compute a statistic value of the leaving likelihood of the object to be determined in the predetermined period and determine that the object to be determined has left the object queue 20 only in a case where the statistic value is greater than or equal to the predetermined value. For example, the statistic value is an average value, a cumulative value, a maximum value, or a minimum value.

The determination unit 2040 computes the leaving likelihood using various parameters related to the object to be determined. Here, a function of outputting the leaving likelihood on the basis of the input parameters will be referred to as a leaving likelihood function. Types of parameters used by the leaving likelihood function will be described later.

The global behavior of the object to be determined is reflected on the leaving likelihood obtained using the leaving likelihood function. For example, in a case where values of the parameters provided to the leaving likelihood function are fixed, the leaving likelihood obtained using the leaving likelihood function is set to vary depending on the global behavior of the object to be determined. More specifically, in a situation where the values of the parameters provided to the leaving likelihood function are the same, the leaving likelihood computed in a case where the global behavior of the object to be determined is the "leaving action" is set to be greater than the leaving likelihood computed in a case where the global behavior of the object to be determined is other than the "leaving action". For example, two leaving likelihood functions f1 and f2 are prepared. f1 and f2 are designed so that f1 outputs a greater value than f2 in a case where parameters having the same values are input into f1 and f2. The determination unit 2040 uses the leaving likelihood function f1 in a case where the global behavior of the object to be determined is the "leaving action", and uses the leaving likelihood function f2 otherwise. For example, f1 can be set as a function of multiplying an output value of f2 by a predetermined value greater than 1.

Hereinafter, the leaving likelihood function will be further described with focus on the parameters used in the leaving likelihood function.

For example, the parameters used in the leaving likelihood function include a distance between the object to be determined and the object to be tracked that is adjacent to the object to be determined in a proceeding direction of the object to be determined. For example, the "object to be tracked adjacent to the object to be determined in the proceeding direction of the object to be determined" means the object to be tracked positioned immediately ahead of the object to be determined in a case where the object to be determined is proceeding, and means the object to be tracked positioned immediately behind the object to be determined in a case where the object to be determined is receding. For example, a function that does not monotonically decrease along with a decrease of the distance is used as the leaving likelihood function that uses the distance between the object to be determined and the adjacent object to be tracked as a parameter.

Besides, for example, the parameters used in the leaving likelihood function includes a distance between the object to be determined and the object queue 20. For example, a function that does not monotonically decrease along with an increase of the distance is used as the leaving likelihood function that uses the distance between the object to be determined and the object queue 20 as a parameter.

Figure 11:
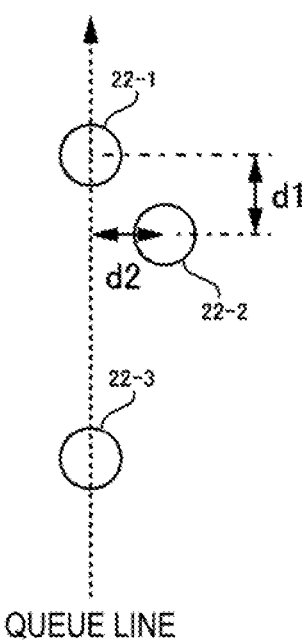
FIG. 11 is a schematic diagram of a case where the object queue is seen from immediately above.

FIG. 11 is a schematic diagram of a case where the object queue 20 is seen from immediately above. It is assumed that the object 22-2 is the object to be determined. In FIG. 11, the object 22-2 is proceeding. Therefore, the determination unit 2040 inputs d1 that is a distance between the object 22-2 and the object 22-1 positioned immediately ahead of the object 22-2 into the leaving likelihood function. Furthermore, the determination unit 2040 inputs a length d2 (a distance between the object 22-2 and the object queue 20) of a perpendicular line 32 that extends to the queue line 30 of the object queue 20 from the object 22-2.

It should be noted that in the example in FIG. 11, a distance between the objects to be tracked is defined as a difference in position in a queue line direction. However, the distance between the objects to be tracked may be represented as a length or the like of a straight line connecting centers of the objects to be tracked.

Besides, for example, the parameters used in the leaving likelihood function may further include a difference between the position in queue (a value representing an ordinal number from the top) of the last object to be tracked of proceeding objects to be tracked and the position in queue of the object to be determined. Usually, in a case where the whole object queue 20 is at a standstill, and then the top proceeds, a proceeding motion sequentially propagates from the top such that the second object subsequently proceeds and the third object subsequently proceeds. Thus, for example, in a case where the top and the second object are proceeding and the third object is at a standstill, there is a possibility that proceeding of the fourth and later objects represents a sign of leaving of the objects.

Therefore, the leaving likelihood can be obtained with higher accuracy using the difference between the position in queue of the last object to be tracked (the second object in the above example) of the proceeding objects to be tracked and the position in queue of the object to be determined as a parameter of the leaving likelihood function. The leaving likelihood function is a function that does not monotonically decrease along with an increase of the difference between the position in queue of the last object to be tracked of the proceeding objects to be tracked and the position in queue of the object to be determined.

Besides, for example, an angle between a movement direction of the object to be determined and a movement direction of the object to be tracked adjacent in the movement direction of the object to be determined may be used as the parameters constituting the leaving likelihood function. Usually, it is considered that the objects lining up in the object queue 20 move in almost the same direction as the proceeding direction of the object queue 20. However, it is considered that a large amount of component of a direction orthogonal to the proceeding direction of the object queue 20 is included in the movement direction of the leaving object. Accordingly, the angle between the movement direction of the object to be determined and the movement direction of the object to be tracked positioned in the leaving direction thereof can be used as a parameter. For example, in the leaving likelihood function, the angle is applied to any trigonometric function.

Besides, for example, the parameters used in the leaving likelihood function may use a difference in movement velocity between the object to be determined and the object to be tracked adjacent to the object to be determined in the proceeding direction of the object to be determined. A case where the object to be determined is leaving forward is considered. In this case, the object to be determined passes by the tracking target lining up immediately ahead of the object to be determined. Thus, a movement velocity of the object to be determined is higher than a movement velocity of the object lining up immediately ahead thereof. Accordingly, the difference between the movement velocity of the object to be determined and the movement velocity of the object to be tracked lining up immediately ahead thereof can be used as a parameter. For example, the leaving likelihood function is a function that does not monotonically decrease along with an increase of the difference in movement velocity.

Figure 12:
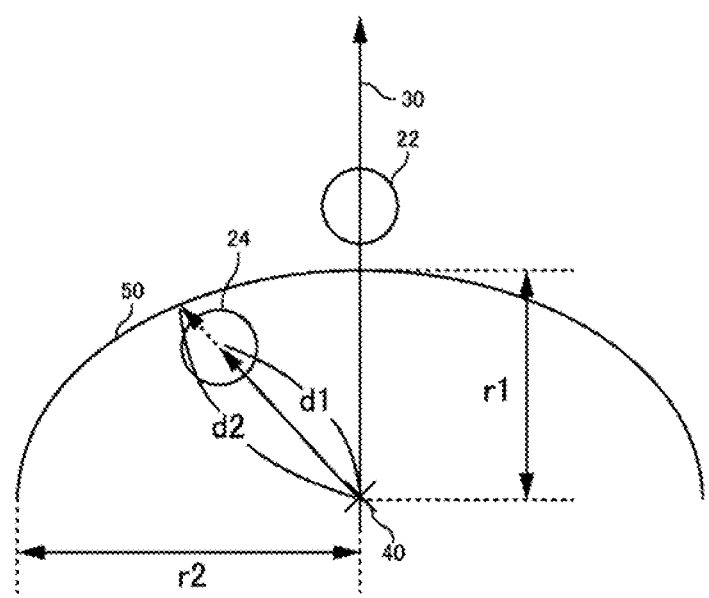
FIG. 12 is a diagram illustrating a predetermined region.

Besides, for example, the leaving likelihood may be computed as follows. First, a predetermined region is determined as follows on the basis of a distance in which the object to be determined can approach the object to be tracked lining up immediately ahead. FIG. 12 is a diagram illustrating the predetermined region. Reference sign 24 denotes the object to be determined. Reference sign 50 denotes the predetermined region.

The determination unit 2040 determines a reference point 40 from a history of a position of the object to be determined 24. For example, the object to be determined 24 moving as in FIG. 12 is assumed. In this case, first, a point of the queue line that has a shortest distance from the position of the object to be determined 24 at each time in a movement history of the object to be determined 24 in the past is obtained as a possible reference point 40. Among the possible reference points, the most recent possible reference point in time-series is handled as the reference point 40. In addition, the reference point 40 may be determined using the local behavior of the object to be determined 24 together. In this case, among the possible reference points 40, the possible reference point that is most recent in time-series and at which the local behavior of the object to be determined 24 at a time point of the possible reference point is the "standstill state" is selected as the reference point 40.

The region 50 is an ellipse determined by a first diameter (a short diameter in FIG. 12) of a length r1 and a second diameter (a long diameter in FIG. 12) of a length r2. r1 denotes a distance in which the object to be determined positioned at the reference point 40 can approach the object 22 lining up immediately ahead. For example, this distance is a length obtained by subtracting a predetermined margin from a distance between the reference point 40 and the object 22.

r2 denotes a predetermined distance that is determined in advance. In a case where the object to be tracked moves in a direction at a right angle with respect to the object queue 20, a distance by which the object to be tracked may be handled as exiting the object queue 20 is denoted by r2.

The determination unit 2040 computes the distance d1 between the reference point 40 and the current object to be determined 24. Furthermore, the determination unit 2040 obtains a position at which a straight line extending to the current object to be determined 24 from the reference point 40 intersects with a boundary line of the region 50. The determination unit 2040 obtains the distance d2 between the computed position and the reference point 40.

The determination unit 2040 uses a ratio (d1/d2) of d1 to d2 as a parameter to be input into the leaving likelihood function. For example, a function that does not monotonically decrease along with an increase of d1/d2 can be used as the leaving likelihood function.

For example, as a method of considering the global behavior of the object to be determined 24, a method of changing a size of the region 50 on the basis of the global behavior of the object to be determined 24 is present. As the size of the region 50 is decreased, it is more easily determined that the object to be determined 24 has left the object queue 20. Therefore, for example, the size of the region 50 in a case where the global behavior of the object to be determined 24 is the "leaving action" is set to be less than the size of the region 50 in a case where the global behavior of the object to be determined 24 is other than the "leaving action". The size of the region 50 can be changed by changing one or both of r1 and r2.

It should be noted that in the above example, the reference point 40 is set using the object to be determined 24 as a reference. Alternatively, the reference point 40 may be the position of the object 22 that is positioned in a direction in which the object to be determined 24 moves. For example, in a case where the object to be determined 24 is proceeding, the position of the object 22 lining up immediately ahead of the object to be determined 24 is set as the reference point. In this case, the determined region can be interpreted as a region in which the object 22 present in the movement direction of the object to be determined 24 is not to be approached anymore.

Example Embodiment 2

Figure 13:
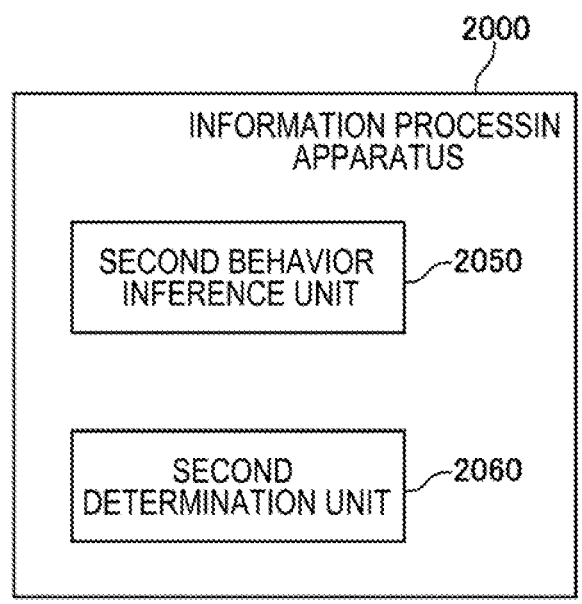
FIG. 13 is a block diagram illustrating a functional configuration of an information processing apparatus of Example Embodiment 2.

FIG. 13 is a block diagram illustrating a functional configuration of the information processing apparatus 2000 of Example Embodiment 2. The information processing apparatus 2000 of Example Embodiment 2 has the same function as the information processing apparatus 2000 of Example Embodiment 1 except for the points described below. The information processing apparatus 2000 of Example Embodiment 2 may perform the leaving determination on the object to be tracked using existing technologies.

The information processing apparatus 2000 of Example Embodiment 2 detects the object 22 from the video data 12 and detects the object queue 20 configured with the objects 22 in the same manner as the information processing apparatus 2000 of Example Embodiment 2. The tracking information is generated and updated in order to manage the objects 22 (objects to be tracked) included in the object queue 20.

The information processing apparatus 2000 of Example Embodiment 2 detects the object 22 that cuts in the object queue 20. A term "cutting-in" will be described. A change in which a new object 22 is added to the object queue 20 is broadly divided into (1) a change in which a new object 22 is added to the object queue 20 from the tail of the object queue 20 and (2) a change in which a new object 22 is added to the object queue 20 from a part other than the tail of the object queue 20 by cutting in between two objects 22 already lining up in the object queue 20. In the present specification, a case of (2) will be referred to as "cutting-in". A case of (1) will be referred to as "normal addition".

More specifically, first, the information processing apparatus 2000 determines whether or not the object 22 detected from the video frame 14 is present close to the object queue 20. Furthermore, the information processing apparatus 2000 associates each object 22 determined as being present closet to the object queue 20 with the object to be tracked included in the tracking information.

The object 22 for which the associated object to be tracked is not present regardless of the determination that the object 22 is present close to the object queue 20 may be present. As such an object 22, for example, (1) the object 22 that tries to be normally added to the object queue 20, (2) the object that tries to cut in the object queue 20, (3) the object that is passing near the object queue 20, or (4) the object that is staying near the object queue 20 is considered.

In a case where the object 22 is the object added to the object queue 20, the object 22 is a normally added object in a case where the object 22 is positioned behind the object to be tracked positioned at the tail of the object queue 20. On the other hand, in a case where the object 22 is positioned ahead of the object to be tracked positioned at the tail of the object queue 20, the object 22 is an object that cuts in.

Therefore, the information processing apparatus 2000 of Example Embodiment 2 handles the object 22 positioned ahead of the object to be tracked positioned at the tail of the object queue 20 as a second object to be determined. The information processing apparatus 2000 determines whether or not the second object to be determined cuts in the object queue 20 (whether or not the second object to be determined is the object 22 corresponding to (2)). Hereinafter, this determination will be referred to as a cutting-in determination.

In a case where the cutting-in determination is performed, the information processing apparatus 2000 infers a global behavior of the second object to be determined based on a relationship between the second object to be determined and the other object 22 included in the object queue 20. The information processing apparatus 2000 performs the cutting-in determination on the second object to be determined based on the inferred global behavior.

Figure 14:
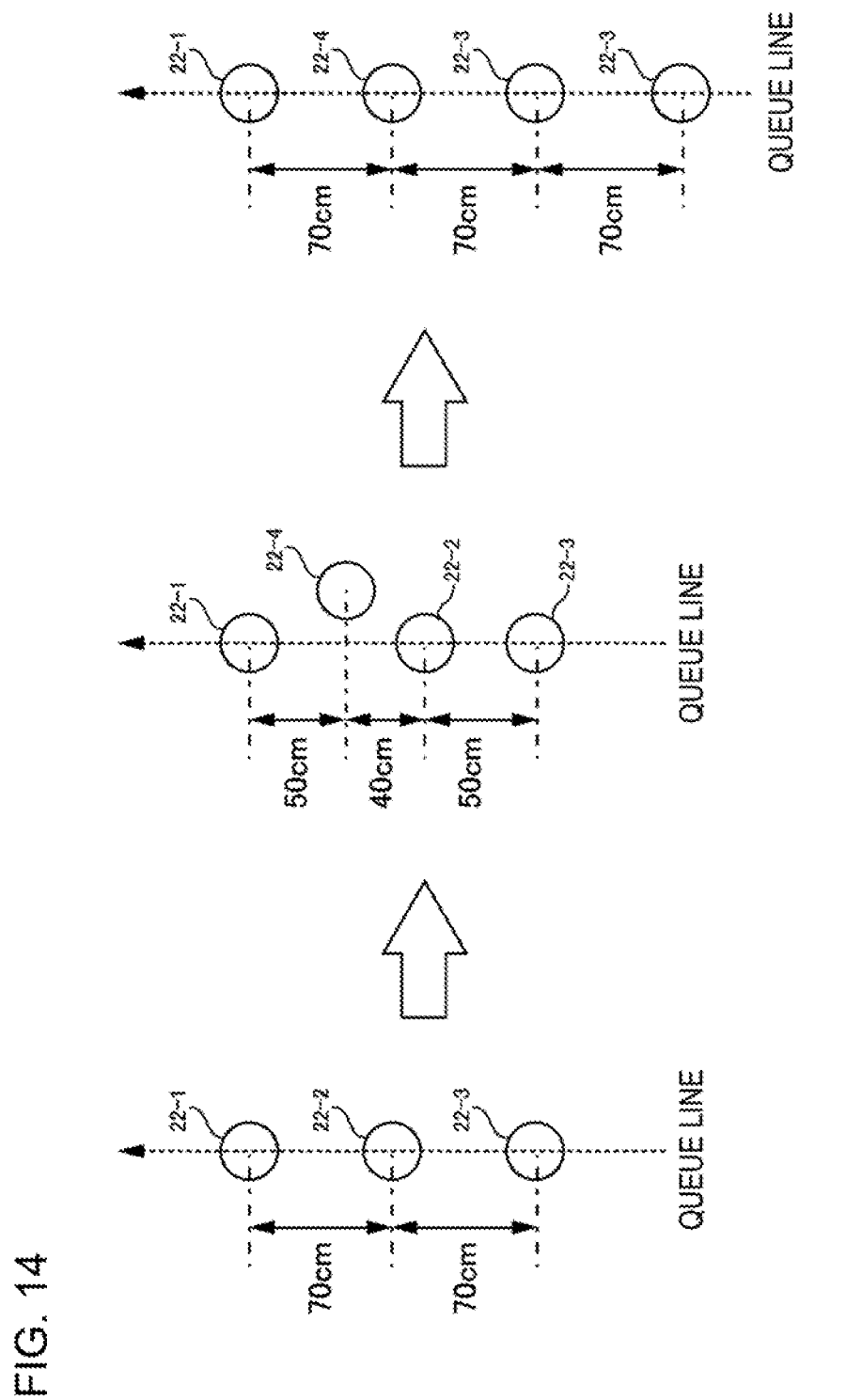
FIG. 14 is a schematic diagram when the object queue is seen from immediately above.

A change of the object 22 (object to be tracked) that occurs in the object queue 20 in a case where the second object to be determined cuts in the object queue 20 will be described. In a case where a new object 22 cuts in the object queue 20, an interval between the objects to be tracked near a location at which cutting-in occurs is decreased from the interval before the occurrence of cutting-in. FIG. 14 is a schematic diagram when the object queue 20 is seen from immediately above. A diagram at the left end illustrates a situation before cutting-in occurs. All of the object 22-1 to the object 22-3 are objects to be tracked. Each object 22 is lined up at an equal interval of 70 cm.

A diagram at the center illustrates a situation in which cutting-in occurs. The object 22-4 cuts in between the object 22-1 and the object 22-2. In a case where the object 22-4 cuts in between the object 22-1 and the object 22-2, the interval between the objects is decreased from 70 cm.

A diagram at the right end illustrates a situation after cutting-in occurs. In a case where cutting-in occurs, the interval between the objects is naturally adjusted by gradual receding of each object to be tracked behind the location at which cutting-in occurs. Finally, the interval between the objects 22 becomes approximately the same as the original interval (70 cm). In actuality, the interval is generally slightly narrower than the interval before cutting-in occurs.

In a case where the object 22 cuts in the object queue 20, the above change occurs. On the other hand, in any of a case where the object 22 is added to the object queue 20 from the tail of the object queue 20, a case where the object 22 is passing near the object queue 20, and a case where the object is staying near the object queue 20, the above change does not occur in the interval between the objects to be tracked in the object queue 20. Accordingly, by considering the global behavior of the second object to be determined based on the relationship between the second object to be determined and the other object 22 included in the object queue 20, whether or not the second object to be determined cuts in the object queue 20 can be accurately recognized.

In order to perform the cutting-in determination by considering the global behavior of the second object to be determined, the information processing apparatus 2000 of Example Embodiment 2 includes a second behavior inference unit 2050 and a second determination unit 2060. The second behavior inference unit 2050 infers the global behavior of the second object to be determined. The second determination unit 2060 determines whether or not the second object to be determined cuts in the object queue 20 on the basis of the inferred global behavior of the second object to be determined.

<Example of Hardware Configuration>

For example, a hardware configuration of a computer that implements the information processing apparatus 2000 of Example Embodiment 2 is represented by FIG. 4 in the same manner as Example Embodiment 1. However, the storage device 1080 of the computer 1000 implementing the information processing apparatus 2000 of the present example embodiment further stores a program module that implements the function of the information processing apparatus 2000 of the present example embodiment.

<Flow of Process>

A summary of a flow of generating and updating the tracking information by the information processing apparatus 2000 of Example Embodiment 2 is represented in FIG. 6 in the same manner as the case of the information processing apparatus 2000 of Example Embodiment 1.

Figure 15:
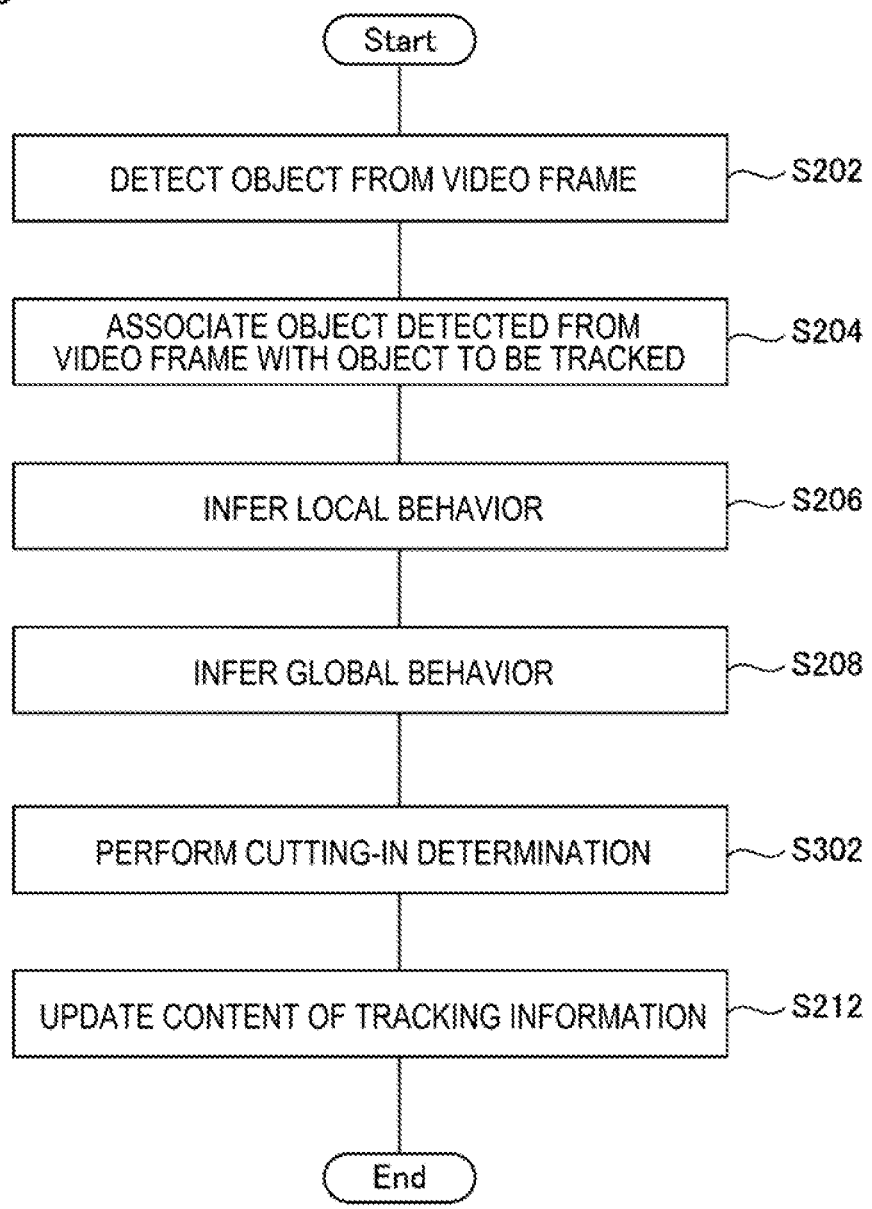
FIG. 15 is a flowchart illustrating a flow of process of updating the tracking information by the information processing apparatus 2000 of Example Embodiment 2.

FIG. 15 is a flowchart illustrating a flow of process of updating the tracking information by the information processing apparatus 2000 of Example Embodiment 2. A flow of updating the tracking information by the information processing apparatus 2000 of Example Embodiment 2 is approximately the same as the flow of updating the tracking information by the information processing apparatus 2000 of Example Embodiment 1. The following two points are different.

First, the behavior inference unit 2020 of Example Embodiment 1 infers the global behavior of the first object to be determined in S208. On the other hand, the second behavior inference unit 2050 of Example Embodiment 2 infers the global behavior of the second object to be determined in S208.

Second, FIG. 8 includes S210. On the other hand, FIG. 15 includes S302. In S302, the second determination unit 2060 determines whether or not the second object to be determined cuts in the object queue 20.

It should be noted that the information processing apparatus 2000 of Example Embodiment 2 may perform the leaving determination in addition to the cutting-in determination. In this case, the flowchart in FIG. 15 includes S210 before or after S302.

<Method of Deciding Object 22 Handled as Second Determination Object>

The information processing apparatus 2000 handles the object 22 that is present close to the object queue 20 and for which the associated object to be tracked is not present as the second object to be determined. There are various methods of determining whether or not the object 22 is present close to the object queue 20. For example, in a case where the distance between the object 22 and the object queue 20 is less than or equal to a predetermined value, the information processing apparatus 2000 determines that the object 22 is present close to the object queue 20. A method of computing the distance between the object 22 and the object queue 20 is described above. Besides, for example, in a case where the object 22 is positioned in the queue area, described above, the second behavior inference unit 2050 determines that the object 22 is present close to the object queue 20.

<Inference of Global Behavior: S208>

The second behavior inference unit 2050 infers the global behavior of the second object to be determined (S208). In a case where the second object to be determined cuts in the object queue 20, the interval between the objects to be tracked ahead and behind a position of cutting-in changes. Therefore, for example, the information processing apparatus 2000 infers the global behavior of the second object to be determined on the basis of the combination of the local behavior of the object and the local behavior of the other object to be tracked (for example, the object to be tracked positioned immediately ahead or behind) adjacent ahead or behind the object.

FIG. 16 is a diagram illustrating a table showing the global behavior of the second object to be determined. It is assumed that the second object to be determined is the object A. In FIG. 16, the object B is an object that is positioned immediately ahead of the object A in the object queue 20 in a case where it is assumed that the object A is included in the object queue 20. The object C is an object that is positioned immediately behind the object A in the object queue 20 in a case where it is assumed that the object A is included in the object queue 20.

FIG. 16 illustrates the global behavior of the object A (that is, the second object to be determined) in association with the combination of the local behaviors of the objects B and C. In FIG. 16, in a case where a combination of local states of the object B and the object C is a combination such that an interval between the object B and the object C is increased, a global state of the object A is set to a "cutting-in action". In a case of other combinations, "staying or passing" is set.

<Detection of Cutting-In: S302>

The second determination unit 2060 performs the cutting-in determination for each second object to be determined (S302). Specifically, the second determination unit 2060 computes a likelihood of the second object to be determined cutting in the object queue 20 on the basis of the global behavior of the second object to be determined. The computed likelihood will be referred to as a cutting-in likelihood. The second determination unit 2060 determines whether or not the second object to be determined cuts in the object queue 20 on the basis of the cutting-in likelihood.

For example, in a case where the cutting-in likelihood computed for the second object to be determined is greater than or equal to a predetermined value, the second determination unit 2060 determines that the second object to be determined cuts in the object queue 20. On the other hand, in a case where the cutting-in likelihood computed for the second object to be determined is less than the predetermined value, the second determination unit 2060 determines that the object to be determined does not cut in the object queue 20.

Besides, for example, the second determination unit 2060 may determine that the second object to be determined cuts in the object queue 20 only in a case where a situation where the cutting-in likelihood of the second object to be determined is greater than or equal to the predetermined value continues for a predetermined period. Besides, for example, the second determination unit 2060 may compute a statistic value of the cutting-in likelihood of the second object to be determined in a predetermined period and determine that the second object to be determined cuts in the object queue 20 only in a case where the statistic value is greater than or equal to the predetermined value. For example, the statistic value is an average value, a cumulative value, a maximum value, or a minimum value.

In a case where the cutting-in likelihood is computed for the second determination object for the predetermined period, the information processing apparatus 2000 needs to also track the object 22 that is not checked as to being added to the object queue 20. Therefore, for example, the information processing apparatus 2000 temporarily adds the object 22 (the object 22 handled as the second determination object) as a computation target of the cutting-in likelihood to the tracking information in an aspect in which the object 22 can be distinguished from the object to be tracked. After it is determined that the object 22 temporarily added to the tracking information cuts in the object queue 20, the object 22 is handled as the object to be tracked.

<Parameters for Computing Cutting-In Likelihood>

The second determination unit 2060 computes the cutting-in likelihood using various parameters related to the second object to be determined. A function of outputting the cutting-in likelihood on the basis of the input parameters will be referred to as a cutting-in likelihood function. Types of parameters used by the cutting-in likelihood function will be described later.

The global behavior of the second object to be determined is reflected on the cutting-in likelihood obtained using the cutting-in likelihood function. A specific method thereof is the same as the method of reflecting the global behavior of the object to be determined on the leaving likelihood obtained using the leaving likelihood function.

Hereinafter, the leaving likelihood function will be further described with focus on the parameters used in the leaving likelihood function.

For example, the parameters used in the cutting-in likelihood function include a distance between the second object to be determined and the object to be tracked lining up immediately ahead of the second object to be determined, and a distance between the second object to be determined and the object to be tracked lining up immediately behind the second object to be determined. The "object to be tracked lining up immediately ahead of the second object to be determined" means the object to be tracked that is positioned immediately ahead of the second object to be determined in the object queue 20 in a case where it is assumed that the second object to be determined is included in the object queue 20. Similarly, the "object to be tracked lining up immediately behind the second object to be determined" means the object to be tracked that is positioned immediately behind the second object to be determined in the object queue 20 in a case where it is assumed that the second object to be determined is included in the object queue 20.

For example, a function that does not monotonically decrease along with an increase of the distance is used as the cutting-in likelihood function that uses the distance as a parameter.

Besides, for example, the parameters used in the cutting-in likelihood function include an angle between a movement direction of the second object to be determined and a movement direction of the object to be tracked. The movement direction of the object that is not lining up in the queue is irregular. On the other hand, the movement direction of the object lining up in the queue is usually forward of the queue. Accordingly, in a case where the second object to be determined is included in the object queue 20, the angle between the movement directions of the second object to be determined and the object to be tracked is significantly small. For example, in the cutting-in likelihood function, the angle can be applied to any trigonometric function. Any object to be tracked can be used as the object to be tracked that is to be compared with the second object to be determined.

Besides, for example, the parameters used in the cutting-in likelihood function include a time-series change in movement direction of the second object to be determined. The second object to be determined cutting in the object queue 20 moves toward the queue line (in a direction orthogonal to the direction of the queue line) before cutting-in and moves on the queue line after cutting-in. Accordingly, for example, in a case where an angle between the second object to be determined and the queue line is applied to a sin function, a value gradually approaches 0 from a value close to 1. For example, in the cutting-in likelihood function, whether or not a change of this value is close to a general pattern of cutting-in can be used. As this general pattern, a great number of objects that cut in may be measured, and a model may be created.

Besides, for example, the parameters used in the cutting-in likelihood function include a staying time of the second object to be determined. In a case where the queue has low fluidity (proceeding takes a certain amount of time), a time in which the object stays at the same position is long. Accordingly, for example, a function that does not monotonically decrease along with an increase of the staying time is used as the cutting-in likelihood function that uses the staying time (for example, a time in which a state where the local state is "standstill" continues).

While example embodiments of the present invention have been described thus far with reference to the drawings, the example embodiments are illustrations of the present invention, and a configuration of combinations of the example embodiments or other various configurations can also be employed.

The invention claimed is:

1. An information processing system comprising:
at least one memory configured to store one or more instructions; and
at least one processor configured to execute the one or more instructions to:
detect a first object and a second object included in an object queue using a captured image in which the object queue is included, infer a behavior of the first object and a behavior of the second object, and infer a behavior of the first object related to the object sequence on the basis of the inferred behavior of the first object and the inferred behavior of the second object; and
determine whether or not the first object has left the object queue on the basis of the inferred behavior of the first object performed with respect to the object sequence.

2. The information processing system according to claim 1,
wherein the at least one processor is further configured to compute a likelihood of the first object having left the object queue on the basis of at least one of a distance between the first object and the second object, a difference in velocity between the first object and the second object, and an angle between a movement direction of the first object and a movement direction of the second object, and the inferred behavior of the first object, and determine whether or not the first object has left the object queue on the basis of the computed likelihood.

3. The information processing system according to claim 1,
wherein, for each of the first object and the second object, the at least one processor is further configured to infer a local behavior that is a behavior focused on an individual object using the captured image, and
infer the behavior of the first object related to the object sequence on the basis of a combination of the local behavior of the first object and the local behavior of the second object.

4. The information processing system according to claim 3,
wherein the local behavior is any one of a proceeding state that represents proceeding, a receding state that represents receding, and a standstill state that represents a standstill.

5. The information processing system according to claim 1,
wherein the behavior of the first object related to the object sequence is any of a first behavior that represents proceeding in the object queue, a second behavior that represents receding in the object queue, a third behavior that represents a standstill, and a fourth behavior that represents leaving.

6. The information processing system according to claim 5,
wherein the at least one processor is further configured to compute a likelihood of the first object having left the object queue by inputting a parameter representing at least one of a distance between the first object and the second object, a difference in velocity between the first object and the second object, and an angle between a movement direction of the first object and a movement direction of the second object, and the behavior of the first object related to the object sequence into a determination model, and determine whether or not the first object has left the object queue on the basis of the computed likelihood, and in a case where the parameter is fixed, the determination model computes the likelihood that is greater when the behavior of the first object related to the object sequence is the fourth behavior than when the behavior of the first object related to the object sequence is other than the fourth behavior.

7. A control method executed by a computer, the method comprising:
detecting a first object and a second object included in an object queue using a captured image in which the object queue is included, inferring a behavior of the first object and a behavior of the second object, and infer a behavior of the first object related to the object sequence on the basis of the inferred behavior of the first object and the inferred behavior of the second object; and
determining whether or not the first object has left the object queue on the basis of the inferred behavior of the first object performed with respect to the object sequence.

8. The control method according to claim 7,
wherein a likelihood of the first object having left the object queue is computed on the basis of at least one of a distance between the first object and the second object, a difference in velocity between the first object and the second object, and an angle between a movement direction of the first object and a movement direction of the second object, and the inferred behavior of the first object related to the object sequence, and whether or not the first object has left the object queue is determined on the basis of the computed likelihood.

9. The control method according to claim 7,
wherein for each of the first object and the second object, a local behavior that is a behavior focused on an individual object is inferred using the captured image, and
the behavior of the first object related to the object sequence is inferred on the basis of a combination of the local behavior of the first object and the local behavior of the second object.

10. A non-transitory computer-readable storage medium storing a program causing a computer to execute:
the control method according to claim 7.

11. An information processing system comprising:
at least one memory configured to store one or more instructions; and
at least one processor configured to execute the one or more instructions to:
infer a global behavior based on a relationship with a second object and a third object included in an object queue for a first object included in a captured image in which the object queue is included using the captured image; and
determine whether or not the first object cuts in the object queue on the basis of the inferred global behavior of the first object.

12. The information processing system according to claim 11,
wherein the at least one processor is further configured to compute a likelihood of the first object cutting in the object queue on the basis of at least one of a distance between the first object and the second object, a distance between the first object and the third object, an angle between a movement direction of the first object and a movement direction of the second object, a time-series change of the movement direction of the first object, and a staying time of the first object, and the inferred global behavior of the first object, and determine whether or not the first object cuts in the object queue on the basis of the computed likelihood.

13. The information processing system according to claim 11,
wherein, for each of the second object and the third object, the at least one processor is further configured to infer a local behavior that is a behavior focused on an individual object using the captured image, and
infer the global behavior of the first object on the basis of a combination of the local behavior of the second object and the local behavior of the third object.

14. The information processing system according to claim 13,
wherein the local behavior is any one of a proceeding state that represents proceeding, a receding state that represents receding, and a standstill state that represents a standstill.

15. The information processing system according to claim 11,
wherein the global behavior is any of a first behavior that represents proceeding in the object queue, a second behavior that represents receding in the object queue, a third behavior that represents a standstill, and a fourth behavior that represents cutting-in.

16. The information processing system according to claim 15,
wherein the at least one processor is further configured to compute a likelihood of the first object cutting in the object queue by inputting a parameter representing at least one of a distance between the first object and the second object, a distance between the first object and the third object, an angle between a movement direction of the first object and a movement direction of the second object, a time-series change of the movement direction of the first object, and a staying time of the first object, and the global behavior of the first object into a determination model, and determine whether or not the first object cuts in the object queue on the basis of the computed likelihood, and
in a case where the parameter is fixed, the determination model computes the likelihood that is greater when the global behavior of the first object is the fourth behavior than when the global behavior of the first object is other than the fourth behavior.

17. A control method executed by a computer, the method comprising:
inferring a global behavior based on a relationship with a second object and a third object included in an object queue for a first object included in a captured image in which the object queue is included using the captured image; and
determining whether or not the first object cuts in the object queue on the basis of the inferred global behavior of the first object.

18. The control method according to claim 17,
wherein a likelihood of the first object cutting in the object queue is computed on the basis of at least one of a distance between the first object and the second object, a distance between the first object and the third object, an angle between a movement direction of the first object and a movement direction of the second object, a time-series change of the movement direction of the first object, and a staying time of the first object, and the inferred global behavior of the first object, and whether or not the first object cuts in the object queue is determined on the basis of the computed likelihood.

19. The control method according to claim 17,
wherein for each of the second object and the third object, a local behavior that is a behavior focused on an individual object is inferred using the captured image, and
the global behavior of the first object is inferred on the basis of a combination of the local behavior of the second object and the local behavior of the third object.

20. A non-transitory computer-readable storage medium storing a program causing a computer to execute:
the control method according to claim 17.

* * * * *